US011334477B2

(12) United States Patent
Memon et al.

(10) Patent No.: US 11,334,477 B2
(45) Date of Patent: May 17, 2022

(54) VIRTUALIZATION OF MULTIPLE COPROCESSOR MEMORY

(71) Applicant: VMware, Inc., Palo Alto, CA (US)

(72) Inventors: Mazhar Memon, Austin, TX (US); Zheng Li, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 17/070,578

(22) Filed: Oct. 14, 2020

(65) Prior Publication Data

US 2021/0026762 A1 Jan. 28, 2021

Related U.S. Application Data

(62) Division of application No. 15/785,106, filed on Oct. 16, 2017, now Pat. No. 10,810,117.

(51) Int. Cl.
| | |
|---|---|
| *G06F 12/02* | (2006.01) |
| *G06F 12/14* | (2006.01) |
| *G06F 21/78* | (2013.01) |
| *G06F 21/12* | (2013.01) |
| *G06F 9/455* | (2018.01) |
| *G06F 9/48* | (2006.01) |
| *G06F 9/4401* | (2018.01) |

(Continued)

(52) U.S. Cl.
CPC .......... *G06F 12/023* (2013.01); *G06F 9/4411* (2013.01); *G06F 9/45558* (2013.01); *G06F 9/4881* (2013.01); *G06F 12/1408* (2013.01); *G06F 21/126* (2013.01); *G06F 21/78* (2013.01); *G06F 9/3004* (2013.01); *G06F 9/3877* (2013.01); *G06F 2009/45583* (2013.01); *G06F 2212/1044* (2013.01); *G06F 2212/1052* (2013.01)

(58) Field of Classification Search
CPC .. G06F 12/023; G06F 9/4411; G06F 9/45558; G06F 9/4881; G06F 12/1408; G06F 21/126; G06F 21/78; G06F 9/3004; G06F 9/3877; G06F 2009/45583; G06F 2212/1044; G06F 2212/1052
See application file for complete search history.

(56) References Cited

U.S. PATENT DOCUMENTS

7,457,414 B1 11/2008 Kahn et al.
9,311,002 B1 * 4/2016 Scott ..................... G06F 3/0638
(Continued)

*Primary Examiner* — Ayoub Alata
(74) *Attorney, Agent, or Firm* — Kim & Stewart LLP (57) ABSTRACT

At least one application runs on a hardware platform that includes a plurality of coprocessors, each of which has a respective internal memory space. An intermediate software layer (MVL) is transparent to the application and intercepts calls for coprocessor use. If the data corresponding to an application's call, or separate calls from different entities (including different applications) to the same coprocessor, to the API of a target coprocessor, cannot be stored within the available internal memory space of the target coprocessor, but comprises data subsets that individually can, the MVL intercepts the call response to the application/entities and indicates that the target coprocessor can handle the request. The MVL then transfers the data subsets to the target coprocessor as needed by the corresponding kernel(s) and swaps out each data subset to the internal memory of another coprocessor to make room for subsequently needed data subsets.

20 Claims, 5 Drawing Sheets

(51) Int. Cl.
*G06F 9/38* (2018.01)
*G06F 9/30* (2018.01)

(56) References Cited

U.S. PATENT DOCUMENTS

| | | | |
|---|---|---|---|
| 2011/0153977 A1* | 6/2011 | Root | G06F 12/0223 711/171 |
| 2012/0109897 A1* | 5/2012 | Janakiraman | G06F 11/1466 707/660 |
| 2014/0344507 A1* | 11/2014 | Piggin | G06F 3/0643 711/103 |
| 2016/0224278 A1* | 8/2016 | Gensler, Jr | G06F 3/067 |
| 2017/0068473 A1* | 3/2017 | Anglin | G06F 3/0689 |
| 2017/0206169 A1* | 7/2017 | Coppola | G06F 9/44505 |
| 2017/0329524 A1* | 11/2017 | Gensler, Jr | G06F 3/0689 |
| 2020/0019860 A1 | 1/2020 | Konieczny | |

* cited by examiner

VIRTUALIZATION OF MULTIPLE COPROCESSOR MEMORY

CROSS-REFERENCE

This application is a divisional of U.S. patent application Ser. No. 15/785,106, filed on Oct. 16, 2017, the entire contents of which are incorporated herein by reference.

TECHNICAL FIELD

This invention relates to computing systems that include coprocessors.

BACKGROUND

As both the extent and complexity of computer processing have grown even in everyday modern life, there is a well-known, ever-increasing need for greater processing power. In many cases, even the increase in processing capability predicted by Moore's Law is insufficient.

One way to increase processing capacity is to distribute the load. "Cloud computing" is one known distribution scheme, in which local systems access shared processing resources such as servers remotely via a network, usually on demand. Although making essentially unlimited resources available, network delays alone preclude use of such an arrangement for many computationally intensive, time-critical or synchronized tasks.

One approach to handling some such tasks is "parallel computing", in which a task is decomposed into discrete sub-tasks that can be performed simultaneously by different processing systems. Certain processing tasks involve operations that can be performed by a system's main processor, but that are so specialized that an auxiliary processor—a coprocessor—may instead be more efficient, thereby leaving the more general operations to the main processor. Coprocessors are thus frequently included in systems to perform such operations as floating point arithmetic, encryption, string processing, I/O interfacing, and signal and graphics processing. Such coprocessors may be locally and/or remotely attached.

The specialization of coprocessors offers many advantages—they are, after all, designed to perform certain tasks especially well—but they also create challenges, especially when a main hardware platform is to be able to access more than one coprocessor, which may have different API protocols, may be distributed, that is, with some or all of them remote, may have unbalanced loading, etc.

To improve performance, many coprocessors include dedicated, internal memory. As just one common example, video data may be stored in the high-speed memory of a graphics processing unit (GPU). Currently, the allocation of coprocessor memory to serve a particular application depends almost entirely on which coprocessor is chosen. This leads to inefficiencies, including overprovisioning and general allocation inflexibility. Furthermore, current systems for managing coprocessors, and thus the memory resource they include, require either specific hardware support, or modification of application code.

What is needed is therefore a system and operational method that makes more efficient use of coprocessors, in particular, with respect to their memories.

DETAILED DESCRIPTION

In broad terms, embodiments enable reallocation of internal coprocessor memory in a manner that may be transparent to the applications calling coprocessors. To understand the concepts of "reallocation" and "transparent" in this context, consider first FIG. 1, which illustrates not only some of the main hardware and software components found in embodiments of the invention, but also how coprocessors, and their internal memory resources, are typically allocated according to the prior art.

Figure 1:
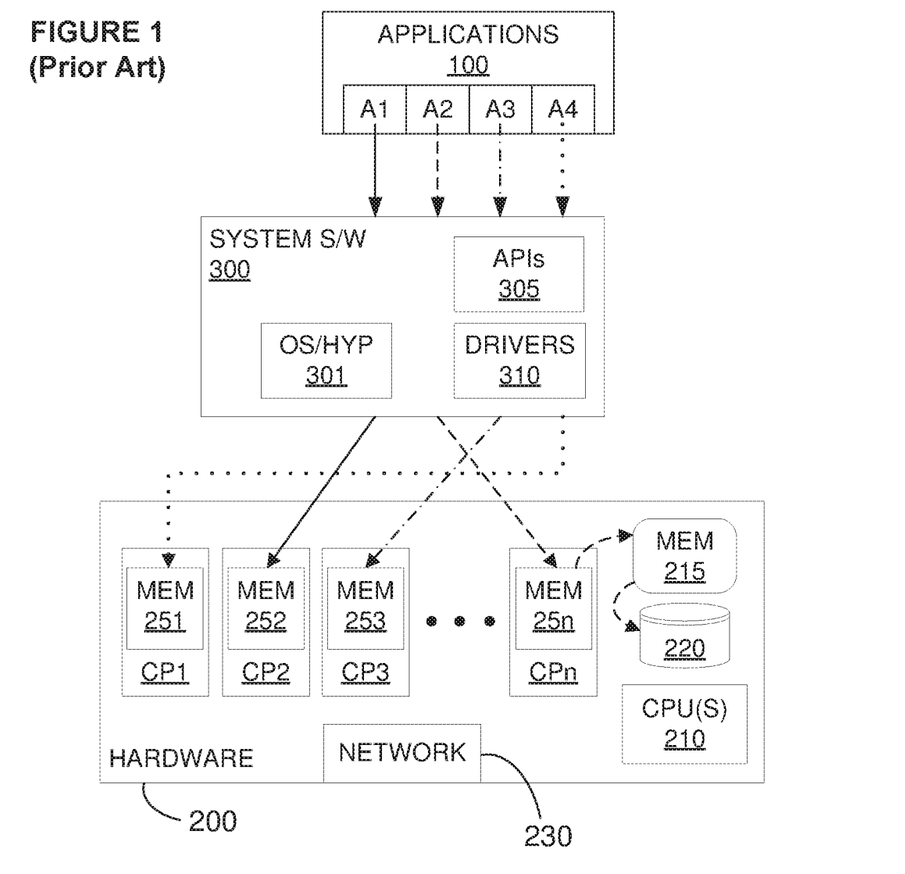
FIG. 1 illustrates, in a simplified form, the main components of an existing system that uses coprocessors and their internal memory resources.

FIG. 1 illustrates one example of a hardware/software stack in which applications 100 run on a host hardware platform 200, typically under the control of a system software layer 300 such as an operating system (OS) and/or hypervisor 301 (in the case where virtual machines are being run). The software layer 300 will typically include drivers 310 that control communication with respective peripheral devices. In addition to other standard components, the hardware platform will include one or more general processors 210, volatile (such as RAM 215) and usually non-volatile (such as SSD, disk, etc., 220) storage components, as well as components for communicating with other systems over a network and other peripherals as needed, for example, network interface components 230.

As is well understood, both user-level applications and system-level software processes (and the memory virtualization layer, described below) are generally embodied as computer-executable code that is stored in either storage 220, memory 215, in a device's dedicated storage/memory, etc., and that is then loaded into the appropriate to the processor(s) or coprocessors for execution. Some instructions, however, especially for specialized devices such as coprocessors, may also be permanently and/or temporarily stored in the devices themselves. In particular, the code comprising an execution kernel for a coprocessor is typically loaded into internal memory of the coprocessor itself.

In many modern computing environments, the application layer 100 includes, and sometimes is even totally comprised of, one or more virtual machines (not shown), in which case the system software 200 may include a system-level virtualization component such as a hypervisor (illustrated as part of the component 301), which acts as the virtual-to-physical interface. In some systems, the hypervisor is co-resident with the host OS, with both operating in a privileged mode; in other systems, the host OS intermediates some or all hypervisor commands to the hardware; in still other systems the hypervisor replaces the host OS altogether; and in systems without virtualized components such as VMs, no hypervisor may be needed and included at all. Embodiments of this invention do not presuppose VMs, although they may operate with VMs as with any other applications that call coprocessor; moreover, system programmers will be able to adapt embodiments to different host OS/hypervisor configurations, including those with no separate host OS at all.

System software and certain other components generally run at a "privileged" level, meaning that they are allowed to issue, and have executed, instructions that affect such things as storage protection settings, interrupt handling, scheduling, I/O coordination, special processor status and register settings, etc. Applications, on the other hand, typically operate in a non-privileged user space, that is, in user mode.

Depending on the configuration, the hardware platform 200 may also include one or more coprocessors CP1, CP2, CP3, ..., CPn, of which graphics processing units (GPUs) are one of many examples; these may, however, also be located within other systems, accessible via any standard buses or networks, such that the concept of "hardware platform" may be broadened to include such "peripheral" or even remote coprocessors, such as coprocessors in cloud computing environments. Embodiments may also be used in other forms of distributed systems, such as a software-defined infrastructure (SDI). The applications 100 may also be running in a distributed processing environment, with more than one server handling processing tasks.

Coprocessors typically have a "master-slave" relationship relative to the normal host CPU(s) 210 that runs the applications—an application is typically run on the host CPU(s) while certain computational tasks are offloaded to coprocessors for increased performance. Compute APIs, that is, APIs 305 that are used by applications to leverage coprocessors, typically have explicit functions to offload computation and move data between host memory and coprocessor device memory.

The API for each coprocessor, accessible by the overall system, is known and exposed to the applications that may wish to use it. Some of these APIs will be open, that is, public, whereas others may be customized for certain coprocessors. Even in the case of customized APIs, however, these will be known to all applications that may need to use the corresponding coprocessor. Since the coprocessors available at any given time are known to the system, their APIs are also known and applications 100 are programmed to properly format API calls to the coprocessors they wish to use.

Applications generally include various core functions, such as the routines needed to communicate processing requests to the operating system, to access the file system, allocate memory, and access common functional libraries for operations such as data compression, image manipulation, accelerated math functions, etc. Compute APIs, specifically, deal with the management of coprocessors, execution flow, and data movement, to make full and efficient use of the coprocessors. This includes dispatching data and compiled compute routines, returning status information, and synchronizing streams of execution between the coprocessors and other coprocessors, and the coprocessors and the host system. Relevant in the context of embodiments of this invention is that parameters specifying not only which coprocessor an application wishes to call, but also parameters from which the required memory can be read or determined are generally included in the corresponding API call issued by an application. As is well known, an API comprises routines and protocols that specify how software components should interact, how a software component such as an application may interact with a hardware component, etc. Note that, whereas different vendors may provide different coprocessors, the corresponding APIs may themselves be either vendor-specific or generic.

OpenCL (Open Computing Language—OCL) is a well-known and widely used language for cross-platform, parallel programming of diverse processors. OpenCL is often used, for example, in APIs. Various features of embodiments of the invention, in particular, APIs, coprocessor kernels and libraries, may therefore be implemented according to OpenCL specifications. This is just one design choice, however, and skilled programmers will know how to use any other parallel processing language or paradigm to implement these software components. Examples of such alternatives include CUDA, SQL, MPI, OpenMP, and OpenACC.

Some prototypes of embodiments of this invention, for example, were developed using NVIDIA graphics processing units (GPUs) as the coprocessors, as well as NVIDIA CUDA GPU drivers. Merely by way of example, and without limitation, various features of embodiments of the invention are therefore described below in terms (such as some commands) of OpenCL and/or CUDA. As mentioned above, however, skilled developers will know how to implementation these features using other languages or formats.

In systems that use NVIDIA GPUs, the CUDA drivers typically reside either in the system software layer, or in a separate intermediate layer between applications and other system software. Regardless of which language and format are used, embodiments are thus able to intercept a stream of API calls from applications and from the thus captured information determine which coprocessor each call is directed to and how much memory the calling application will require to complete the coprocessor request.

In a standard OCL stack, characteristics of available coprocessors, including which devices these are, are available from OCL libraries, which may be included in the host platform or the devices themselves. An application may then use standard OpenCL calls through respective vendor Installable Client Drivers (ICDs) to create a standardization and abstraction layer for the application-specific libraries. As part of the call, the application will include any required execution parameters, as well as various inputs, which may include data, memory address ranges and indices, etc. The call may then pass to the designated target coprocessor, which may then run to complete the task.

Typically, applications 100 call specific coprocessors. In FIG. 1, application A1 (solid line) has called CP2, application A2 (dashed line) has called CPn, application CP3 (dash-dotted line) has called CP3 and application A4 (dotted line) has called CP1. In general, not only is the application-coprocessor relationship static, so is the limitation to whatever internal memory (251, 252, 253, ... 25n) the respective coprocessor has.

Assume now that application A2 needs, for example, 10 GB of memory, but the coprocessor it has called—CPn, has only 5 GB of internal memory available. In some cases, in this situation, the prior art simply returns to the application some form of "Insufficient Memory" indication and the task the application wanted the coprocessor to perform cannot either not be carried out at all, or must be performed using some other processor, if possible. To the extent the prior art handles such cases of insufficient coprocessor memory, it does so "vertically", that is, hierarchically: as the other dashed arrows illustrate, the system software or coprocessor driver may use the available 5 GB in the internal coprocessor memory, and then may use progressively "higher", slower devices in the storage hierarchy, such as system memory 215, and then, if even that doesn't have enough free allocatable space, possibly remote memory or slower local system storage 220, up to remote storage. In short, even in a computing environment with coprocessors, the prior art manages coprocessor memory substantially the way it manages system memory, reverting to progressively slower options as the faster ones run out of available space.

Figure 2:
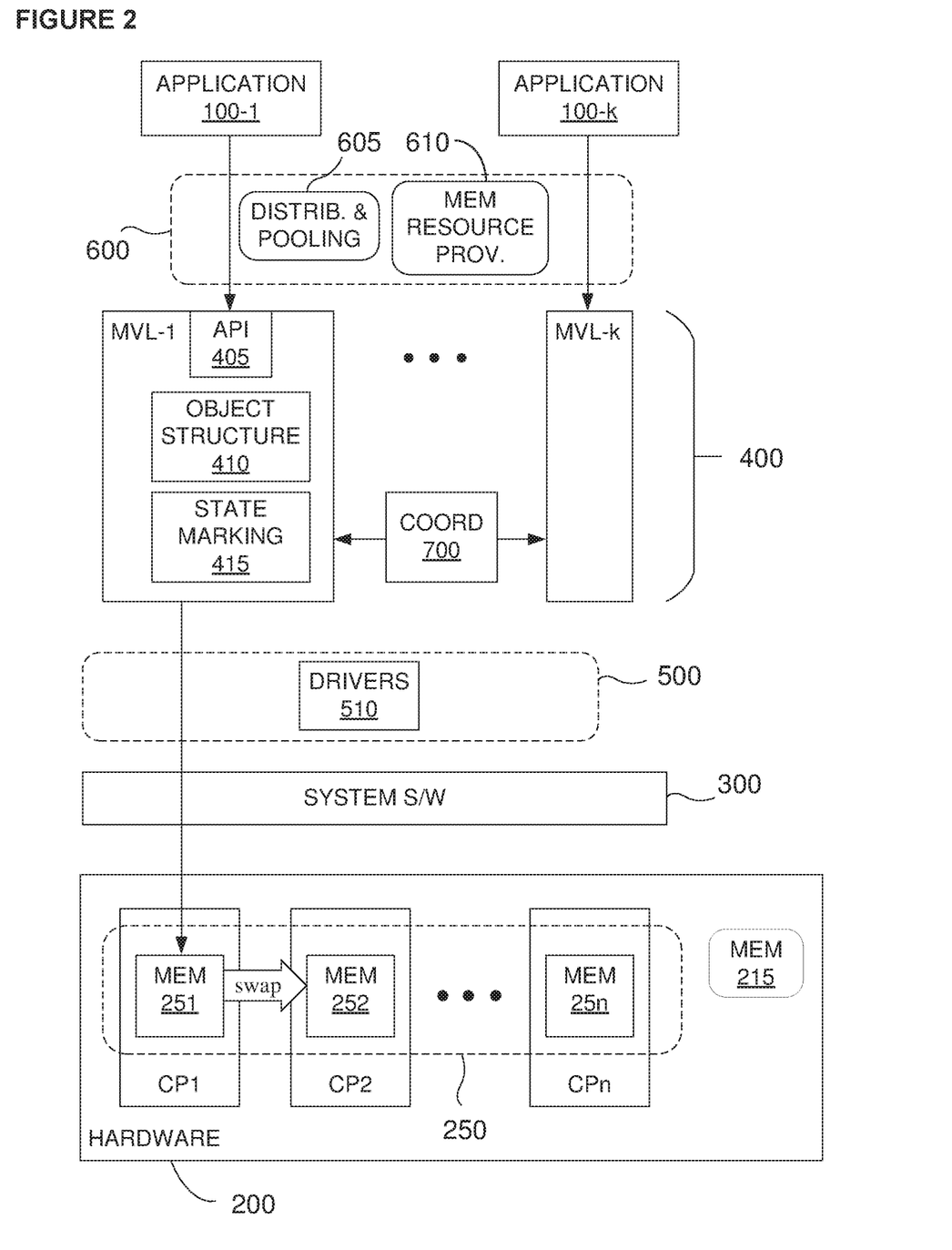
FIG. 2 illustrates the main features of an embodiment that enables transparent coprocessor memory reallocation.

FIG. 2 illustrates, in simplified and at least partially conceptual form, novel components of embodiments of the invention, which includes a memory virtualization layer (MVL) 400 that "pools" coprocessor memory in a way that is transparent to applications and requires no modifications of hardware. In practice, in embodiments, the different coprocessor memories 251, 252, 253, . . . , 25n may be viewed and managed as a pool 250, that is, a "CP pool". The concept of pooling may be extended to define a "local pool" as well and/or a "global pool". The local pool may comprise not only the CP pool, but also the memory/storage 215/220 resources of the hardware platform on which the CPs are running, and the global pool may comprise the local pools of more than one host hardware platform. It would also be possible to define and use a "global CP pool", comprising the coprocessor memories of not only the hardware platform on which a given application is running, but of other hardware platforms as well, with conventional network or bus communication between them.

Figure 3:
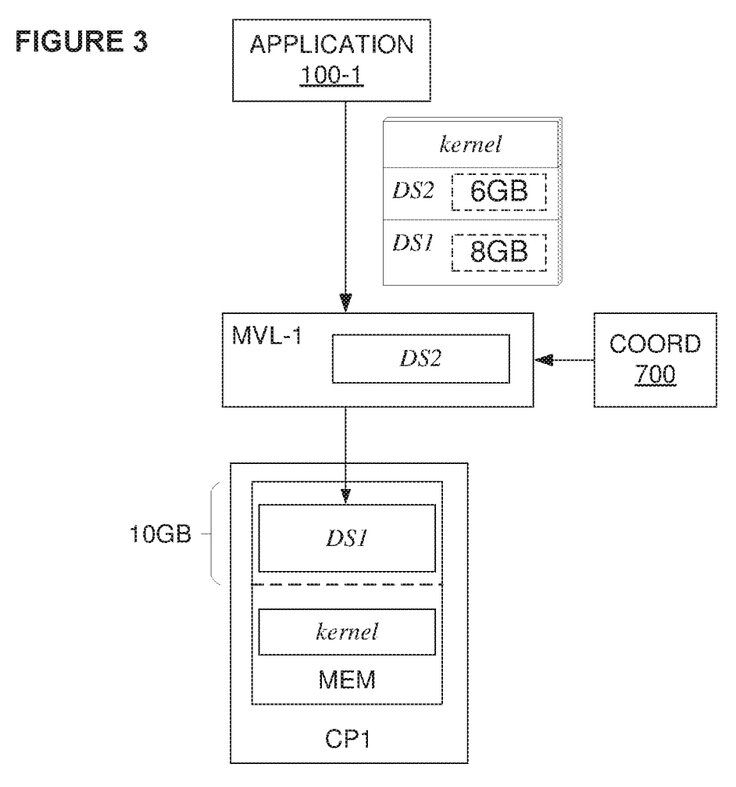
FIG. 3 illustrates a situation of insufficient coprocessor memory.

In one basic embodiment, an MVL instance 100-1, . . . , 100-k is created for each of k applications 100-1, . . . , 100-k that include coprocessor calls. In one embodiment, each MVL instance is stored in the system memory space allotted to its corresponding application itself. Assume there is insufficient internal coprocessor memory available to store the entire data set associated with an application's coprocessor API call, but the data set comprises separately processable sub-sets. The MVL may determine this by examining the parameters, including data dependencies, that are included along with a kernel dispatch. As one example, expressed in CUDA, the parameters will be observable within the call cuLaunchKernel(param1, param2, etc.) One example of such a situation is illustrated in FIG. 3: An application 100-1 wishes to dispatch to coprocessor CP1 an execution kernel along with a 14 GB data set. The data set comprises two separately executable sub-sets DS1 of 8 GB and DS2 of 6 GB. Note that the MVL will be able to determine the size of the data set from the API call, and may be able to determine that there are separately executable portions of the data set by examining the kernel. Typically, prior art systems would, in response to the API call, return to the calling application an Insufficient Memory indication, since the 14 GB data set cannot fit in the 10 GB available space of the coprocessor memory.

According to the invention, however, the MVL may respond to the API call in such a way as to indicate that there is sufficient memory. The MVL then loads one sub-set at a time into the coprocessor as needed for kernel execution, and then swaps it out and loads the next needed data sub-set into the coprocessor memory. In FIG. 3, along with kernel, the 8 GB data sub-set DS1 is loaded into the internal memory of coprocessor CP1, whereas sub-set D2 is stored either in the memory space of the MVL itself, or in some other memory space accessible by the MVL, that is, anywhere in the local or global pool.

But now assume that the coprocessor has completed execution of the kernel portion that involves processing of data sub-set set D1. The MVL will be able to determine this by waiting for completion of the native kernel call. Consider two scenarios:

1) cuLaunchKernel (a method that dispatches the kernel routine on the device) is synchronous/blocking—in which case MVL may wait for it to complete; or 2) if the cuLaunchKernel is asynchronous/nonblocking, the API will have explicit calls to "synchronize" the execution. cuStreamSynchronize, for example synchronizes a stream of execution and ensures that when it returns, the computation on the GPU is complete. In this latter case, MVL may wait for this command to finish.

Figure 4:
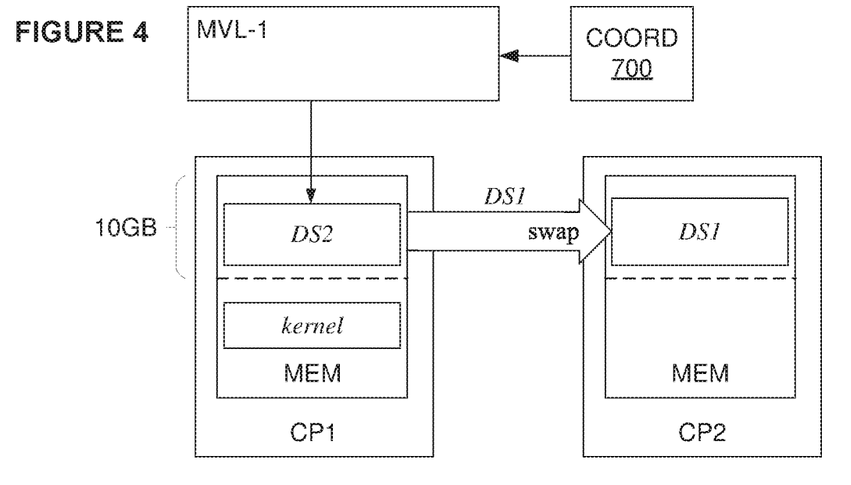
FIG. 4 illustrates transparent coprocessor memory swapping.

As FIG. 4 illustrates, the MVL may then swap DS1 out of coprocessor CP1 memory, for example, into the memory of CP2, or some other location (such as system memory space allocated to the host, that is, calling application), and load DS2 into the memory of CP1 for use in execution of the corresponding kernel portion. Results of kernel processing of both DS1 and DS2 may be returned to the application, as if the entire 14 GB data set had been loaded into CP1 all at once, as the application was led to "believe" by the MVL intercepting and manipulating the API call response.

Although embodiments make it possible to swap out data sets from a coprocessor memory in order to make space available for another data set, swapping out is not always either needed or even desirable, even with different kernels. For example, a first kernel could operate on a data set, which remains in the coprocessor memory to form an input to a second kernel, which further transforms the data, which remains in the coprocessor memory to form an input to a third kernel, and so on. As a more concrete example, an application relating to computer vision might sequentially dispatch kernels that split channels, filter colors, saturate, vectorize, etc., a single input data set, such as an image.

The MVL will need to know to which "victim" coprocessor it can swap out data sub-sets. One possibility would be to implement a static priority, that is, to designate certain coprocessors with relatively larger memories as having lower priority than others, such that for each coprocessor with a relatively smaller memory, there is one or more of the other coprocessors predetermined to be its ordered group of "victims". In other embodiments, however, the swapping-out procedure may include getting permission from a supervisory coordination component 700 (the "coordinator") to designate a current victim coprocessor in case of insufficient memory, or to signal that no swap-out will be permitted, for example, because larger-memory coprocessors are all busy. In cases where no victim coprocessor is available, the coordinator may direct the MVL to swap out data sub-sets to some other memory/storage medium, such as system memory or storage, local or remote.

In the example described above, and shown in the figures, the original data set DS comprises only two subsets, namely DS1 and DS2. This is shown only by way of example, albeit an example that may in fact occur. The data set associated with an API call to a coprocessor may comprise any number (one or more) of "portions", that is data subsets, which may be stored and swapped out following the same procedure as described. Note that it is not necessary to handle only one subset at a time. For example, assume that the target coprocessor memory has a 16 GB capacity, and that the current data set comprises DS1 (8 GB), DS2 (6 GB), DS3 (3 GB) and DS4 (10 GB). It would be possible for the MVL to store both DS1 and DS2 in the coprocessor at the same time, swap them out, and then store DS3 and DS4, or to swap out DS1 when it is no longer needed and store DS3, and then swap out DS2 to make room for DS4 while the kernel is processing DS3. In other words, as long as there is enough internal memory space that is not immediately needed, the corresponding data subsets can be swapped out to make room for other data subsets.

The memory virtualization layer 400 may be implemented either as a separate software layer, or as part of a more general abstraction layer that may include components to virtualize or manage other aspects of coprocessor calls. The MVL 400 may run in non-privileged user space, that is, not necessarily in system software such as an OS/hypervisor 301, or in an application 100, but rather as an intermediate layer between these two other layers in the hardware/software stack. Thanks to this, the invention can be portable, installed in a wide range of environments.

The MVL 400 may run in a non-privileged execution mode, in which case security and data confidentiality may be enforced without compromising the system with additional privileged code. Furthermore, unlike other approaches, additional features can be introduced into the MLV without having to change the underlying operating system, drivers, or virtual machine hypervisors. This configuration leads to other advantages such as ease of installation and use, portability, universality, and convenience, other configurations are possible. System designers may also choose, however, to install the MLV at the privileged level, and even into system software.

In the configuration shown in FIG. 2, another intermediate software "vendor" layer 500 includes such vendor-provided, coprocessor-specific tools as specialized drivers 510. For example, these components could be the NVIDIA drivers, although this is just one design choice. The vendor-specific components may, however, also be included in other layers, including the system software layer 300.

Furthermore, the MVL may be implemented so as to interface directly with applications 100, or it may be configured to cooperate with and receive information from a more general virtualization and control layer 600, which might, for example, include components that perform such tasks as memory profiling, general resource managers, encryption, memory protection features (e.g., page coloring), keeping track of and managing the distribution and pooling (605) of the coprocessors in general (including determining which coprocessors an application may use), or of provisioning of the overall set of available memory resources (610). In other words, the data set that the MVL handles need not be the "raw" data provided by the application, but rather may be processed before the MVL inputs it.

The MVL itself may include various components, that is software modules, which may be provided either separate from or included in any other intermediate layer. In the embodiment illustrated in FIG. 2, these components include a module 405 for intercepting and examining applications' API calls 405 and determining which of them relate to coprocessor memory, a module 410 that extracts and stores information on the structure of memory objects and may create and destroy such objects, a module 415 that tracks memory state (such as where any cached data is resident and whether it is "dirty", that is incoherent with what is stored in physical memory). Here, a "memory object" may be any data structure that indicates, possibly among other information, where each data set has been allocated. Over time, there will typically be many allocations and deallocations, and what applications and MVL instances each is associated with. For example, the system should know where each written data set is resident (on a coprocessor, elsewhere in a pool, etc.). For copy operations, the system should know where the most recent version is so that the data stored in a coprocessor can be updated before it is copied.

The MVL may extract information on which memory objects are in use by observing (directly or, for example, by querying the higher layer 600, if included) and tracking (using module 410, for example) coprocessor kernel launches from the applications, since kernels also specify input/output operations. Extracting memory usage information from API calls, and from kernel launches, also enables the MVL to avoid interfering with ongoing coprocessor operations.

The code that comprises the MVL may be installed in the system and configured using any known method, including downloading it from a network, reading in the code from a tangible, non-volatile storage medium, etc. This is in fact one advantage of the invention: It may be installed like other user-level applications, including applications that interact with other applications, with no need to modify the system software or include dedicated or modified hardware.

As part of a call for a coprocessor, an application will typically indicate how much memory it will require. For example, using CUDA, API calls cudaMalloc and cudaFree are made to specify how much memory needs to be allocated, or can be freed. The standard response to the call will include an indication of whether the chosen coprocessor is able to meet the requirements, in particular, for memory. In the prior art, if the chosen coprocessor has insufficient memory, then either the request is denied, or some slower memory technology with enough space is called into use.

As mentioned above, in embodiments of the invention, the MVL intercepts the API call to a selected coprocessor call and determines if the chosen coprocessor has enough available memory space. If it does, then the coprocessor may proceed as usual. If not, however, the MVL may make a request of the coordinator 700 to find space on some other coprocessor in the local or global pool, before having to resort to slower technologies. If there is available space on a different coprocessor, either because it is idle, or because its contents can be swapped out temporarily (such as to system memory or storage), then the MVL returns a response to the calling application indicating that the request can be met.

Even though applications may have a "fixed" view of coprocessor resources, the MVL interposes on the stream of API calls that applications issue and replies on the basis not only of the memory of the coprocessor the application expects to use, but rather on the basis of viewing the coprocessor memory as one in a pool that can be used for any call. In short, the MVL allows applications to maintain their fixed view of the coprocessor resources, in including coprocessor memory, but in fact it virtualizes this view, creating a mapping between which coprocessor memory an application thinks it's using and which one it is actually using. Thus, an application that has called to device D will still dispatch the corresponding kernel to D, but the device memory space actually used to handle the request may be relocated to a different device D* whose memory contents, at least temporarily, will have been swapped out to make space.

In embodiments described above, the coordinator 700 determines a "victim" coprocessor memory in response to a request by the MVL. This is just one choice. The coordinator in other embodiments could proactively examine the active memory usage of the various coprocessors and cause them to give up unused memory instead of, or in addition to, reacting to calls by MVL instances. It would also be possible to implement some MVL responsibilities in the coordinator itself, such as to maintain a global coprocessor memory availability table for global allocator.

Figure 5:
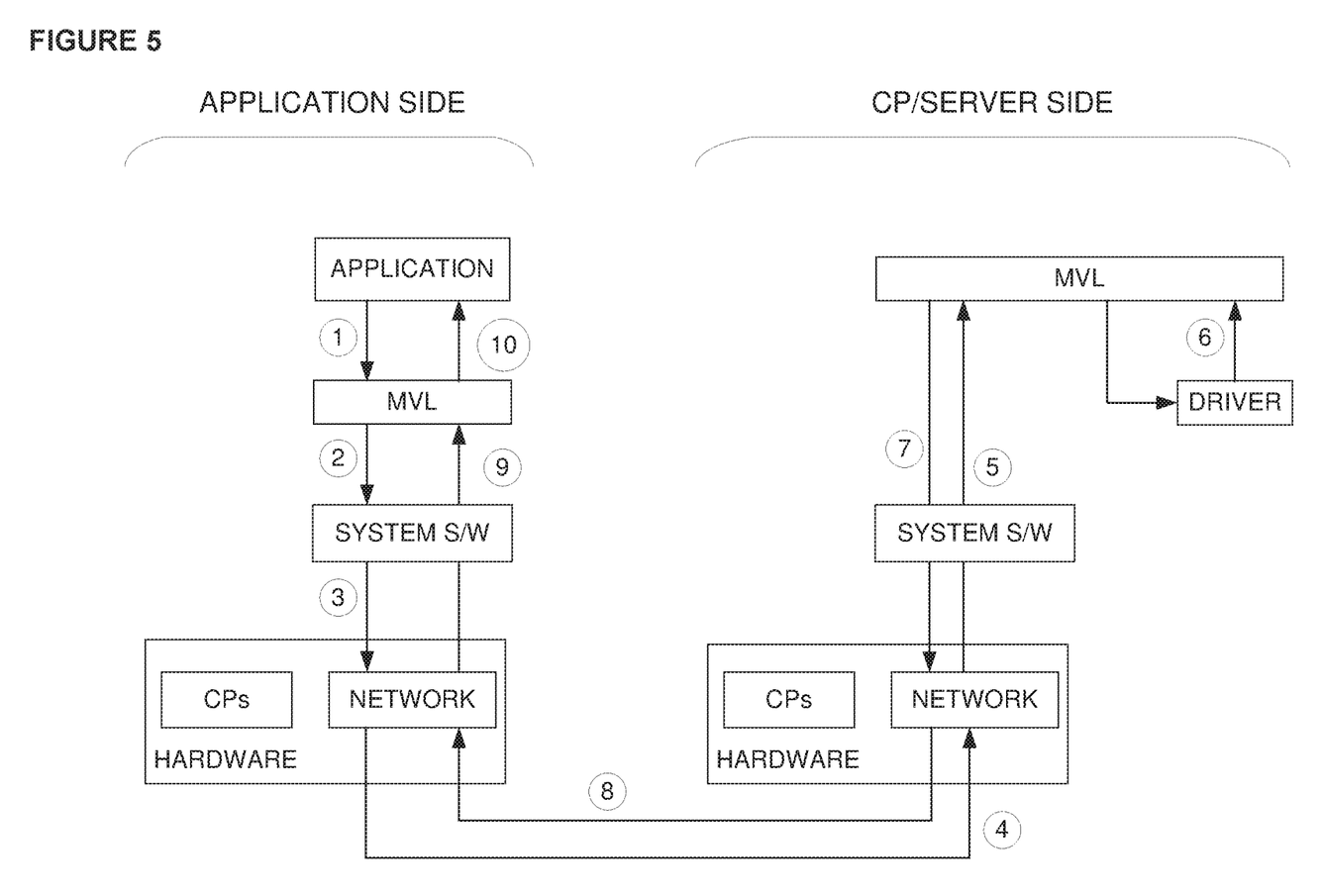
FIG. 5 illustrates interception of memory-related aspects of application API calls.

FIG. 5 illustrates interception of memory-related aspects of application API calls. Different features of this interception are numbered 1-10:

1) The MVL captures the API stream from its associated application. This will typically also provide the requested device (here, coprocessor) ID and memory availability. For example, for a CUDA API stream, a cudaGetDevice( . . . ) call may return such information.

2) The device ID used by the application is mapped to whatever internal identifier is used to identify all available local and, if implemented, remote coprocessors. In other words, although the application may know only of local coprocessors, the MVL system as a whole may manage or at least access, coprocessors on other platforms as well, and the global set of coprocessors will also have respective identifiers.

3) The request for the coprocessor resource (in particular, here, memory) is transmitted from the client/application side, over the network, to the functional coprocessor/server side of FIG. 5.

4) The application-side request is received.

5) The received request is passed to and received by the MVL.

6) In implementations that are configured using NVIDIA, the request is then properly formatted and passed to the user-space driver, which may be done as a normal functional call. (Note that there may also be a privileged level, kernel-space driver that the user-space driver communicates with.) Availability of the requested coprocessor resource may then be indicated as a success or failure, for example, using a call such as the CUDA cuGetDevice.

7) The MVL may then input and pass on any code returned by the driver (or similar components from other vendors, if included).

8) The request results are then returned to the application/client side via the network.

9) The request is then mapped back to the ID of the originally requested device.

10) The cudaGetDevice( . . . ) return code may be returned to the calling application, which may then resume execution.

Note that the MVL is intercepting and changing the response that the application gets back from its API call, such that the application "believes" the coprocessor it is calling is able to handle its request, even with respect to memory space.

Figure 6:
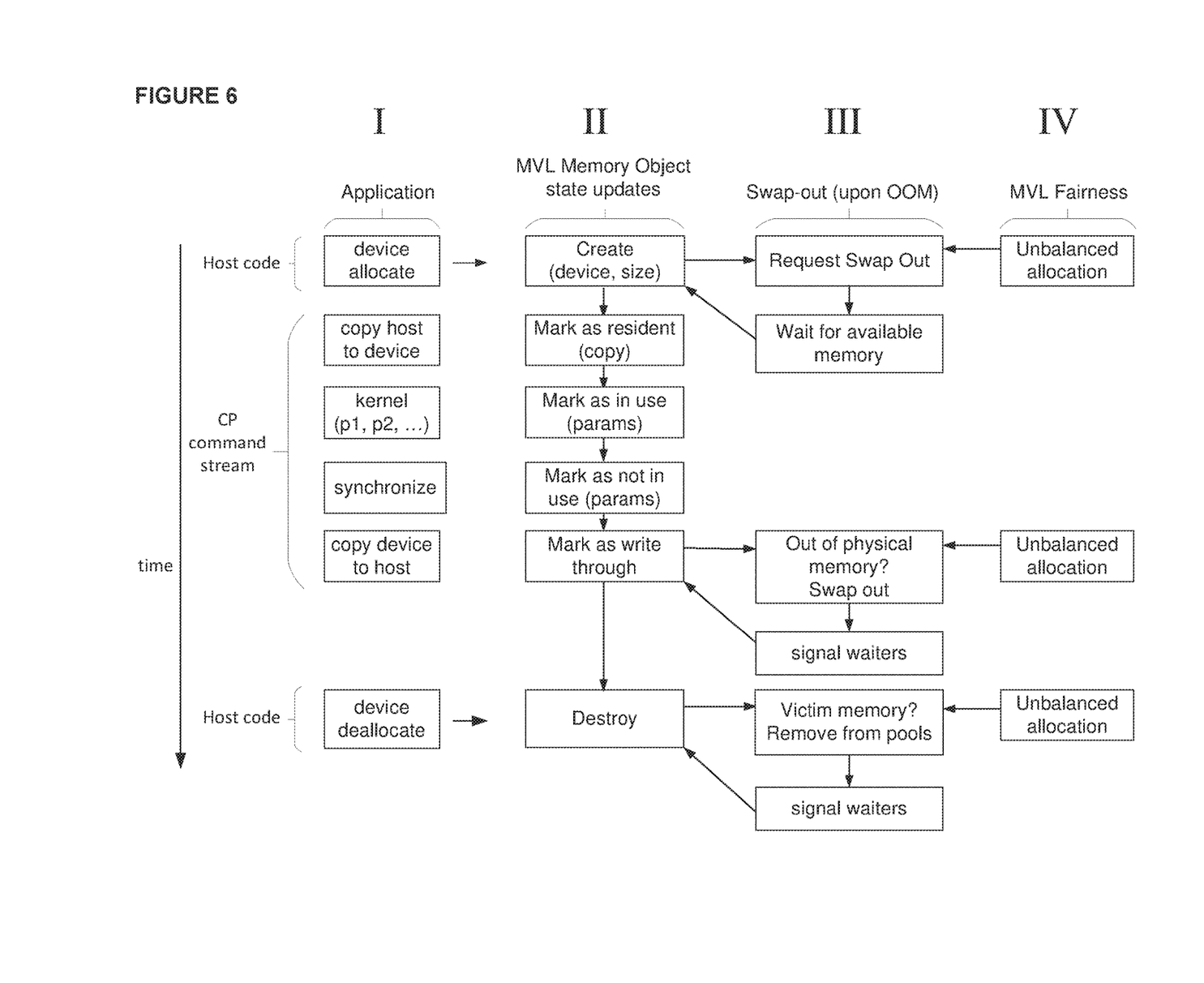
FIG. 6 illustrates coprocessor memory virtualization process flows.

FIG. 6 illustrates the flow of application ("column" I), MVL and coordinator processes ("column" IV), in an embodiment. As for the MVL processes, two different flows are illustrated: one ("column" II), for the MVL state updates of memory objects, and another ("column" III), for the swap-out process in an Out Of Memory (OOM) condition. The various boxes of columns I-III (except for waiting and signaling steps) are arranged and at least approximately aligned vertically according to a time axis to illustrate that some operations of the MVL happen synchronously with corresponding phases of the application process flow.

Viewing FIG. 6 only "vertically", the application flow (which may, for example, be a CUDA or OpenCL API stream) begins with the host allocating a called device (here, coprocessor). In conventional systems, as part of the coprocessor command stream, the host (the data set the application wishes to pass to the selected coprocessor) is copied to the device (here, the coprocessor). The application will also have dispatched to the coprocessor the kernel it wishes the coprocessor to execute, along with the various parameters p1, p2, . . . the kernel needs as inputs to execute the dispatched kernel. The coprocessor command stream then needs to be synchronized with a completion marking done by the MVL, that is, the application waits until it knows that kernel execution has completed and it is safe to copy data, since the application will then have the coprocessor results and the application can continue executing. After completion of execution of the kernel, the device results may be copied back to the calling host, after which the device may be deallocated and, for example, made available for use in a subsequent call.

Embodiments of this invention alter the "standard" procedure of application flow, transparent to the application itself, by intercepting the original API call and kernel. Given the information in the call and kernel, the MVL may determine the identity of the coprocessor involved and the size of memory space that will be required. If the called coprocessor has enough space, then it may allow the coprocessor the application called to handle the call as usual: It will copy the required data to the coprocessor memory and mark it as resident. At this point, the data may be resident, but the coprocessor kernel may not have begun to execute. In that period, the data may be marked as being safe to swap out if necessary. When the kernel begins to execute, however, the MVL may mark the data as being in use, since it will comprise the parameters the kernel needs and cannot generally be relocated at run-time without unacceptable complexity or delay. The MVL may then pin that memory space so that it will not be swapped out. When the data is no longer in use, however, it may be marked as not being in use, indicating that it is safe to swap out as long as a copy is stored. Once the kernel has completed execution, the data may be marked for write-through, for example, to system memory, at which point it would be safe to swap it out even without making a copy. The memory object may then be destroyed and removed from all pools.

Assume, however, that the memory space of the called coprocessor is not sufficient for the current task. In the prior art, the system may simply return an indication that the task cannot be done because of insufficient memory. In contrast, embodiments of the invention may initiate a swap-out procedure ("column" III), in which the MVL instance for the application requests from the coordinator 700 a swap-out of some other coprocessor memory that is large enough. The MLV may make this request as soon as it determines the device and memory size the application has requested. The MLV may wait for memory to be available for swap-out; if the waiting time exceeds some threshold, then it may allocate non-coprocessor memory as well, that is, it too may begin "vertical" swap-out; alternatively, it too could simply return an indication of insufficient memory. But if there is memory in a different coprocessor that can be made available by swapping out what is currently in it, then this may be indicated back to the MLV. The MLV may then create a corresponding memory object, with a mapping to the memory of the coprocessor from which memory contents are to be swapped out to make space.

At this point, the data the application calls with will be "clean", since it is not yet resident on any coprocessor and there are no copies anywhere that must be maintained coherent. The MLV may then proceed as before, marking the data as being resident, in use, etc. At the point where the MLV marks resident data as being for write-through, the swap-out process may check to see if there is enough physical memory and it signals waiting MLV instances to wait until there is. As for the write-through step, in some cases it may be the most efficient to leave result data in the coprocessor memory; for example, the output data of one kernel execution may be the input data needed for the next-executing kernel. Result data may, however, be written through even to system memory so that it will be globally visible to the application. This allows for data to be left on a coprocessor so that the pool has the most recent copy, while still making it available to the application as well.

When a data object is to be destroyed, the swap-out process may "return" the previously swapped-out data to its "original" coprocessor. It must determine, however, if that coprocessor has sufficient memory available and, if so, remove the data from the pool. During this return operation, the swap-out process may signal the MVL to wait to update the state of the corresponding memory object.

As FIG. 6 illustrates ("column" IV), embodiments preferably include a mechanism to enforce a fairness and/or efficiency policy when it comes to determining which member of a coprocessor pool should be chosen to swap out its memory to make room, if at all. Fairness may be enforced by the coordinator 700, which may be the component that fields and handles MLV requests for a "bigger" coprocessor memory space via swapping out. One goal of the fairness and efficiency policy will typically be that all applications should be allowed to make forward progress in execution; one policy may therefore be time-based, that is, no swap-out, with consequent waiting of the "swapped out" applications, should not have to go on longer than some time, or number of processing cycles, etc. To prevent having to interrupt ongoing coprocessor execution, this should therefore be estimated in advance, using known techniques or heuristics, such that the coordinator 700 preferably chooses "target" coprocessors (those whose memory will be swapped out to make space) to minimize expected wait times.

Other factors may influence this choice. For example, assume that an application wishes to call CP0, which does not have enough memory. If CP2, for example, is networked with CPU0 over a faster bus or network than CP1, CP2 may be a better choice. Yet another factor might be "popularity" or load, that is, how relatively frequently a particular coprocessor is called, or what percentage of the time it is executing. Assume, for example, that CP1 is called much more often than CP3, or that it is executing twice as much of the time as CP3. In such a case, the coordinator may be designed to increase the tendency to swap out from CP3, since this would probably cause less total wait time over all. Still another allocation factor might be relative "packing" percentage. For example, assume that the application needs 10 GB, but its called coprocessor CP0 has only 5 GB, that CP4 has 11 GB capacity, but CP5 has 20 GB. To allocate CP5 could lead to a much larger amount of data having to be swapped out temporarily (and then back in), with a full 10 GB "overhead", whereas choosing CP4 would leave only 1 GB overhead and, all other things being equal, would probably be faster. The coordinator could also implement an allocation policy analogous to the Least Recently Used (LRU) or Most Recently Used (MRU) policies used for cache management, or any known policy based on application-coprocessor affinity. As still another example, the coordinator may use memory allocations as a way to enforce performance throughput to the application—it could, for example, give higher priority tasks more coprocessor memory at the expense of lower priority ones, for example, to meet the requirements of a Quality of Service allocation policy.

Of course, the coordinator 700 may consider more than one such factor or policy, or any other chosen factors, in deciding whether to approve swap-out and, if so, from which coprocessor memory is to be swapped out to make space to satisfy a call. These different factors could, for example, be weighted, with the weights adjusted in real time as coprocessor usage changes.

In the figures, the component 700—the coordinator—is shown as being separate from the MVL instances. This will often be efficient, since this component may then act as a supervisory component that may operate even to create MVL instances. It would also be possible, however, to include the coordination function in components within the MVL instances themselves, and to choose a "victim" coprocessor using a polling procedure. For example, if MVL-1 needs 10 GB to handle a call from application 100-1, but the coprocessor it has called has only 5 GB available, then MVL-1 could broadcast a message to all other current MVL instances to request allocation of one of their coprocessor memories. For example, the MVL instance of a currently idle coprocessor could signal back to MVL-1 that it is able to temporarily relinquish use of its coprocessor memory. If more than one signal back availability, then MVL-1 could choose the one most local, or that has the memory that would cause the least overhead, etc.

The transparent swap-out technique described above may be used advantageously in more situations than just enabling an application to use a coprocessor it might not otherwise be able to use because of insufficient memory. As just one example, multiple entities (such as applications) could be assigned the same, or same set of coprocessors, such as GPUs, and promised the entire coprocessor memory. For example, assume that N clients running on a platform that has GPUs, each of which has X GB of memory. The invention would make possible overprovisioning of GPU memory by a factor of N*X/X=N times.

Note that two different kernels from different entities (routines or portions of code within a single application, or two different applications/users/etc.) can typically execute on a coprocessor concurrently as long as there is enough memory to allocate on the coprocessor; the kernels may be both resident in the coprocessor at the same time, or may be loaded alternately. For example, a CUDA or similar runtime (roughly, the coprocessor's runtime that is in the device driver) may multiplex more than one stream of execution. Thus, the overprovisioning made possible by at the least the above-mentioned embodiment could enable an even greater degree of execution concurrency, since swapping out the active memory of a coprocessor, with MVL and coordinator scheduling of coprocessor assignment, could "virtually" increase the available coprocessor memory.

In such an embodiment, there may be no need to determine whether a single application needs more coprocessor memory than the intended coprocessor has and schedule the subsets separately, with swap-out, although this is also possible; rather, the combined data need of all the applications (one example of entities) may be treated as "the" input data set, with the data of each application being treated as a subset that is stored in the coprocessor for execution but swapped out when a different application needs the internal memory for its own data. Also, in this embodiment, different kernels will typically be used by each application, such that the stored kernels themselves may also need to be swapped out as different applications are given access to use the coprocessor.

Neural networks offer another example of a type of application that may benefit from the invention. As is known, neural networks comprise layers of "nodes" that are weighted, usually algebraically, to form the values of nodes in a next deeper layer, and so on, until a final or deepest layer is computed. A neural network thus represents a structure in which the values of nodes in one layer are processed similarly to form inputs to the nodes of the next layer, which are processed similarly, etc. The initial input values may thus comprise an initial data subset that is loaded into the coprocessor, whereby the kernel and its parameters perform the computations to generate a result vector, whose elements are the node values passed as inputs to the next network layer, with the previous values being swapped out, which then executes a kernel corresponding to that next layers weight computations, and so on, iteratively, until the final data subset—the result—is computed. Each new layer thus corresponds to another data subset, although only the initial input data subset will be known in advance. Along with the swapping out procedure, the invention could thus be used to implement a neural network using a single execution coprocessor, but with extensive swapping out (the single MVL instance would swap out its own unused memory objects) due to the "self-overprovisioning" of coprocessor memory each layer computation causes.

Because the MVL intercepts memory interactions, security features such as encryption may be added in the data path as data sets (whole or in subsets) are transferred to remote GPU servers. This would then reduce the attack surface and improves data confidentiality. In such embodiments, it would also be possible to add such data-transformation operations into the MVL as encryption, compression, and/or augmenting each data subset with verification information such as a checksum, error correction bits, etc., whereby additional coprocessor kernel code may be run, before the application's kernel itself is run on the stored data, to restore the transformed data to its original, user-level form, by corresponding "inverse" operations such as decryption/decompress/verification/etc.

In some systems, there may be several coprocessors, such as GPUs, that are idle a lot or even most of the time. This is an often costly inefficiency that the invention may help alleviate. In the presence of a runtime scheduler and resource manager, the ability to overprovision memory over a pool of GPUs may be used to increase the utilization of hardware: Using the memory swap-out procedure of embodiments of the invention, fewer GPUs may be needed to handle the coprocessing needs of a given number of applications.

The ability to swap coprocessor memory contents may also be used in coprocessor environments that need to ensure high availability. In such systems, coprocessor memory may be mirrored in more than one pool so that in the event of failure, data can be recovered and deployed onto another coprocessor.

What is claimed is:

1. A data processing method carried out on a hardware platform on which a plurality of entities including a first entity and a second entity are run via system software, wherein the hardware platform comprises a first coprocessor including a first internal memory and a second coprocessor including a second internal memory, said method comprising:

intercepting, by an intermediate software layer running logically between the plurality of entities and the system software, a first call by the first entity and a second call by the second entity for use of the first coprocessor, the first call including a first execution kernel and an indication of required memory capacity for a first execution data set operated on by the first execution kernel, the second call including a second execution kernel and an indication of required memory capacity for a second execution data set operated on by the second execution kernel, wherein the combined required memory capacity for both the first execution data set and the second execution data set is greater than the first internal memory of the first coprocessor;

returning to the first and second entities, in response to the first and second calls, respectively, indications of sufficient memory capacity; and multiplexing the first execution kernel and the second execution kernel to execute concurrently on the first coprocessor, wherein said multiplexing includes:

loading the first execution data set of the first execution kernel in the first internal memory of the first coprocessor and executing the first execution kernel;

swapping out the first execution data set of the first execution kernel from the first internal memory of the first coprocessor to the second internal memory of the second coprocessor;

loading the second execution data set of the second execution kernel in the first internal memory of the first coprocessor and executing the second execution kernel; and transferring execution results of the first execution kernel to the first entity and execution results of the second execution kernel to the second entity.

2. The method of claim 1, wherein the entities are applications.

3. The method of claim 1, wherein the entities are different routines within an application.

4. The method of claim 1, further comprising:
swapping back in the first execution data set of the first execution kernel from the second internal memory of the second coprocessor to the first internal memory of the first coprocessor.

5. The method of claim 4, further comprising:
executing the first execution kernel after the first execution data set has been swapped back in from the second internal memory of the second coprocessor to the first internal memory of the first coprocessor.

6. The method of claim 4, further comprising:
swapping out the second execution data set of the second execution kernel from the first internal memory of the first coprocessor to the second internal memory of the second coprocessor.

7. The method of claim 1, further comprising:
loading the first and second execution kernels at the same time into the first internal memory of the first coprocessor such that the first and second execution kernels are resident in the first coprocessor at the same time.

8. A data processing system comprising:
a hardware platform that includes a first coprocessor including first internal memory, and a second coprocessor including second internal memory;
a plurality of entities that includes a first entity and a second entity, each of the entities running on the hardware platform via system software; and
an intermediate software running logically between the plurality of entities and the system software, wherein the intermediate software is configured to:
intercept a first call by the first entity and a second call by the second entity for use of the first coprocessor, the first call including a first execution kernel and an indication of required memory capacity for a first execution data set operated on by the first execution kernel, the second call including a second execution kernel and an indication of required memory capacity for a second execution data set operated on by the second execution kernel, wherein the combined required memory capacity for both the first execution data set and the second execution data set is greater than the first internal memory of the first coprocessor, return to the first and second entities, in response to the first and second calls, respectively, indications of sufficient memory capacity, and multiplex the first execution kernel and the second execution kernel to execute concurrently on the first coprocessor by:

loading the first execution data set of the first execution kernel in the first internal memory of the first coprocessor and executing the first execution kernel;

swapping out the first execution data set of the first execution kernel from the first internal memory of the first coprocessor to the second internal memory of the second coprocessor;

loading the second execution data set of the second execution kernel in the first internal memory of the first coprocessor and executing the second execution kernel; and transferring execution results of the first execution kernel to the first entity and execution results of the second execution kernel to the second entity.

9. The data processing system of claim 8, wherein the entities are applications.

10. The data processing system of claim 8, wherein the entities are different routines within an application.

11. The data processing system of claim 8, wherein said multiplexing further includes:

swapping back in the first execution data set of the first execution kernel from the second internal memory of the second coprocessor to the first internal memory of the first coprocessor.

12. The data processing system of claim 11, wherein said multiplexing further includes:

executing the first execution kernel after the first execution data set has been swapped back in from the second internal memory of the second coprocessor to the first internal memory of the first coprocessor.

13. The data processing system of claim 11, wherein said multiplexing further includes:

swapping out the second execution data set of the second execution kernel from the first internal memory of the first coprocessor to the second internal memory of the second coprocessor.

14. The data processing system of claim 8, wherein said multiplexing further includes:

loading the first and second execution kernels at the same time into the first internal memory of the first coprocessor such that the first and second execution kernels are resident in the first coprocessor at the same time.

15. A non-transitory computer-readable medium comprising instructions executable on a hardware platform on which a plurality of entities including a first entity and second entity are run via system software, wherein the hardware platform comprises a first coprocessor including a first internal memory and a second coprocessor including a second internal memory, and wherein the instructions when executed on the hardware platform cause the hardware platform to carry out a method comprising:

intercepting, by an intermediate software layer running logically between the plurality of entities and the system software, a first call by the first entity and a second call by the second entity for use of the first coprocessor, the first call including a first execution kernel and an indication of required memory capacity for a first execution data set operated on by the first execution kernel, the second call including a second execution kernel and an indication of required memory capacity for a second execution data set operated on by the second execution kernel, wherein the combined required memory capacity for both the first execution data set and the second execution data set is greater than the first internal memory of the first coprocessor;

returning to the first and second entities, in response to the first and second calls, respectively, indications of sufficient memory capacity; and multiplexing the first execution kernel and the second execution kernel to execute concurrently on the first coprocessor, wherein said multiplexing includes:

loading the first execution data set of the first execution kernel in the first internal memory of the first coprocessor and executing the first execution kernel;

swapping out the first execution data set of the first execution kernel from the first internal memory of the first coprocessor to the second internal memory of the second coprocessor;

loading the second execution data set of the second execution kernel in the first internal memory of the first coprocessor and executing the second execution kernel; and transferring execution results of the first execution kernel to the first entity and execution results of the second execution kernel to the second entity.

16. The non-transitory computer-readable medium of claim 15, wherein the entities are applications.

17. The non-transitory computer-readable medium of claim 15, wherein the entities are different routines within an application.

18. The non-transitory computer-readable medium of claim 15, wherein said multiplexing further includes:

swapping back in the first execution data set of the first execution kernel from the second internal memory of the second coprocessor to the first internal memory of the first coprocessor.

19. The non-transitory computer-readable medium of claim 18, wherein said multiplexing further includes:

swapping out the second execution data set of the second execution kernel from the first internal memory of the first coprocessor to the second internal memory of the second coprocessor.

20. The non-transitory computer-readable medium of claim 15, wherein said multiplexing further includes:

loading the first and second execution kernels at the same time into the first internal memory of the first coprocessor such that the first and second execution kernels are resident in the first coprocessor at the same time.

* * * * *